(12) United States Patent
Argnani

(10) Patent No.: US 11,598,468 B2
(45) Date of Patent: Mar. 7, 2023

(54) PLASTIC PIPE WITH BELL JOINT

(71) Applicant: IPM S.R.L., Lugo (IT)

(72) Inventor: Claudio Argnani, Fusignano (IT)

(73) Assignee: IPM S.R.L., Lugo (IT)

( * ) Notice: Subject to any disclaimer, the term of this patent is extended or adjusted under 35 U.S.C. 154(b) by 532 days.

(21) Appl. No.: 16/342,256

(22) PCT Filed: Oct. 17, 2017

(86) PCT No.: PCT/IB2017/056438
§ 371 (c)(1),
(2) Date: Apr. 16, 2019

(87) PCT Pub. No.: WO2018/073739
PCT Pub. Date: Apr. 26, 2018

(65) Prior Publication Data
US 2019/0257459 A1    Aug. 22, 2019

(30) Foreign Application Priority Data

Oct. 18, 2016    (IT) .......................... 102016000104207

(51) Int. Cl.
*F16L 47/08*    (2006.01)
*F16L 47/06*    (2006.01)
*E03F 3/04*    (2006.01)

(52) U.S. Cl.
CPC .............. *F16L 47/08* (2013.01); *F16L 47/06* (2013.01); *E03F 3/04* (2013.01)

(58) Field of Classification Search
CPC .............. F16L 47/08; F16L 47/06; E03F 3/04
(Continued)

(56) References Cited

U.S. PATENT DOCUMENTS 3,948,546 A * 4/1976 Welsby .................. F16L 33/16
285/239
4,331,625 A * 5/1982 van de Zee ............ F16L 47/08
264/249

(Continued)

FOREIGN PATENT DOCUMENTS

CA    2231915    9/1998
CN    2116141    9/1992
(Continued)

OTHER PUBLICATIONS

International Search Report dated Feb. 9, 2018 in International (PCT) Application No. PCT/IB2017/056438.
(Continued)

*Primary Examiner* — James M Hewitt, II
(74) *Attorney, Agent, or Firm* — Wenderoth, Lind & Ponack, L.L.P.

(57) ABSTRACT

A pipe made of plastics includes a female end with a bell joint suitable to receive a male end of another pipe and an inner wall with a seat for a gasket suitable to abut an external wall of the male end. When the pipe and other pipe are connected, a joint is formed having a hydraulic seal. The inner wall of the bell joint has at least one closing lip with an annular shape, which extends towards the inside of the bell joint, towards an external front edge of the bell joint, and includes an abutment edge, which adheres to, and tightens with a predefined force, the external wall of the male end. The closing lip is interposed between the external front edge and the seat and forms, with the inner wall, an annular cavity that opens in the direction of the external front edge.

9 Claims, 2 Drawing Sheets

(58) Field of Classification Search
USPC .................................................. 285/231, 349
See application file for complete search history.

(56) References Cited

U.S. PATENT DOCUMENTS

| | | |
|---|---|---|
| 6,176,523 B1 | 1/2001 | Winslett |
| 2004/0108714 A1 | 6/2004 | Houghton |

FOREIGN PATENT DOCUMENTS

| | | | | |
|---|---|---|---|---|
| CN | 202032225 | | 11/2011 | |
| DE | 3310226 A1 | * | 10/1984 | .............. F16L 21/03 |
| EP | 0 482 277 | | 4/1992 | |
| EP | 1041332 A1 | * | 10/2000 | .............. F16L 47/08 |
| KR | 101 029 344 | | 4/2011 | |

OTHER PUBLICATIONS

Office Action dated Jun. 29, 2020 in corresponding Chinese Patent Application No. 201780063946.4, with English translation.

* cited by examiner

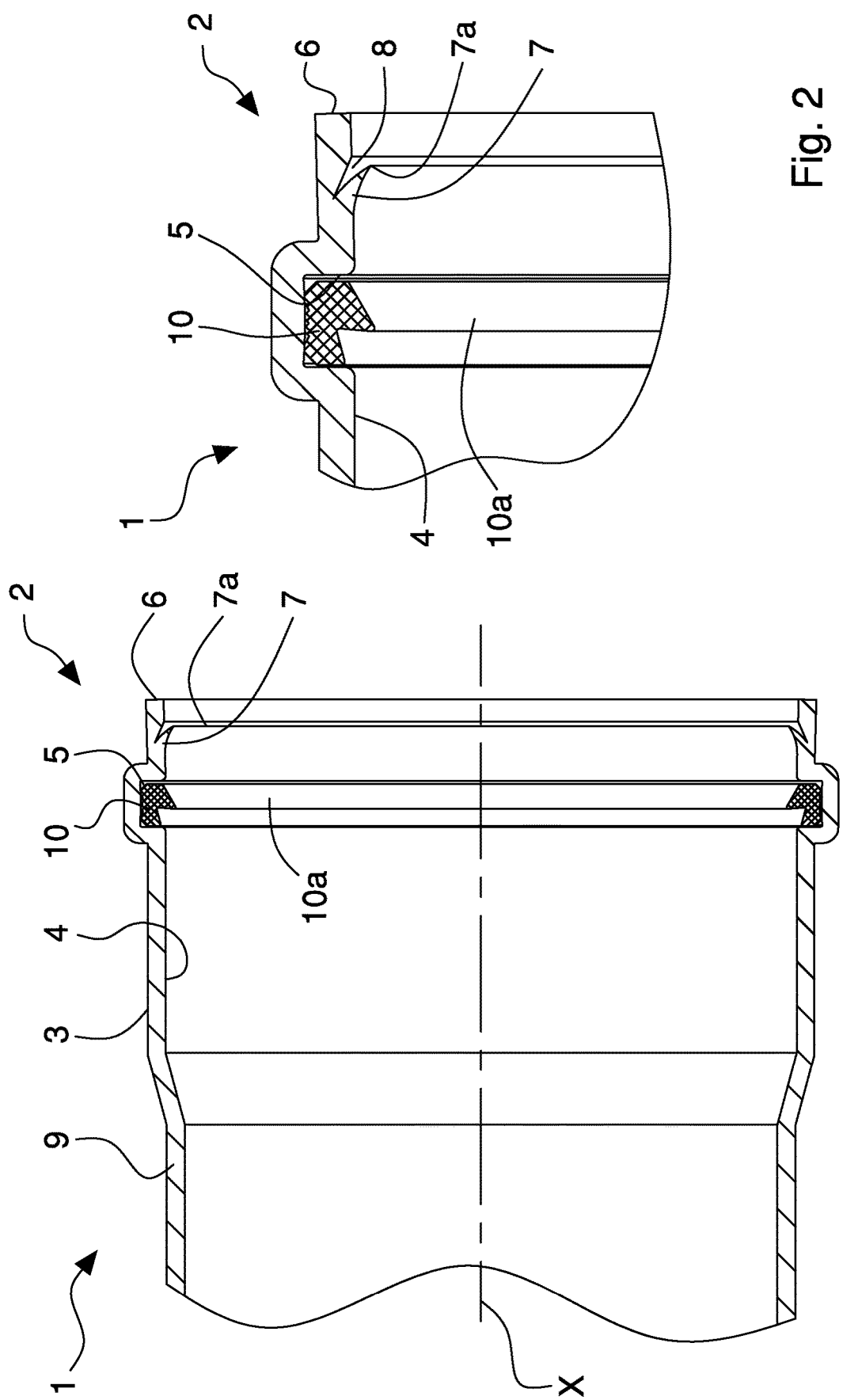

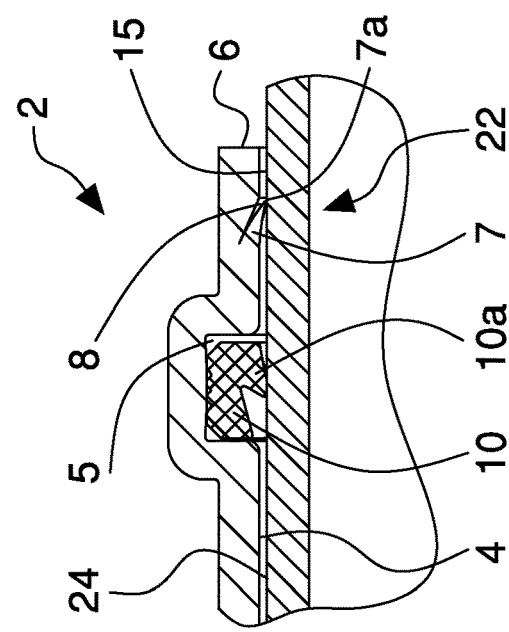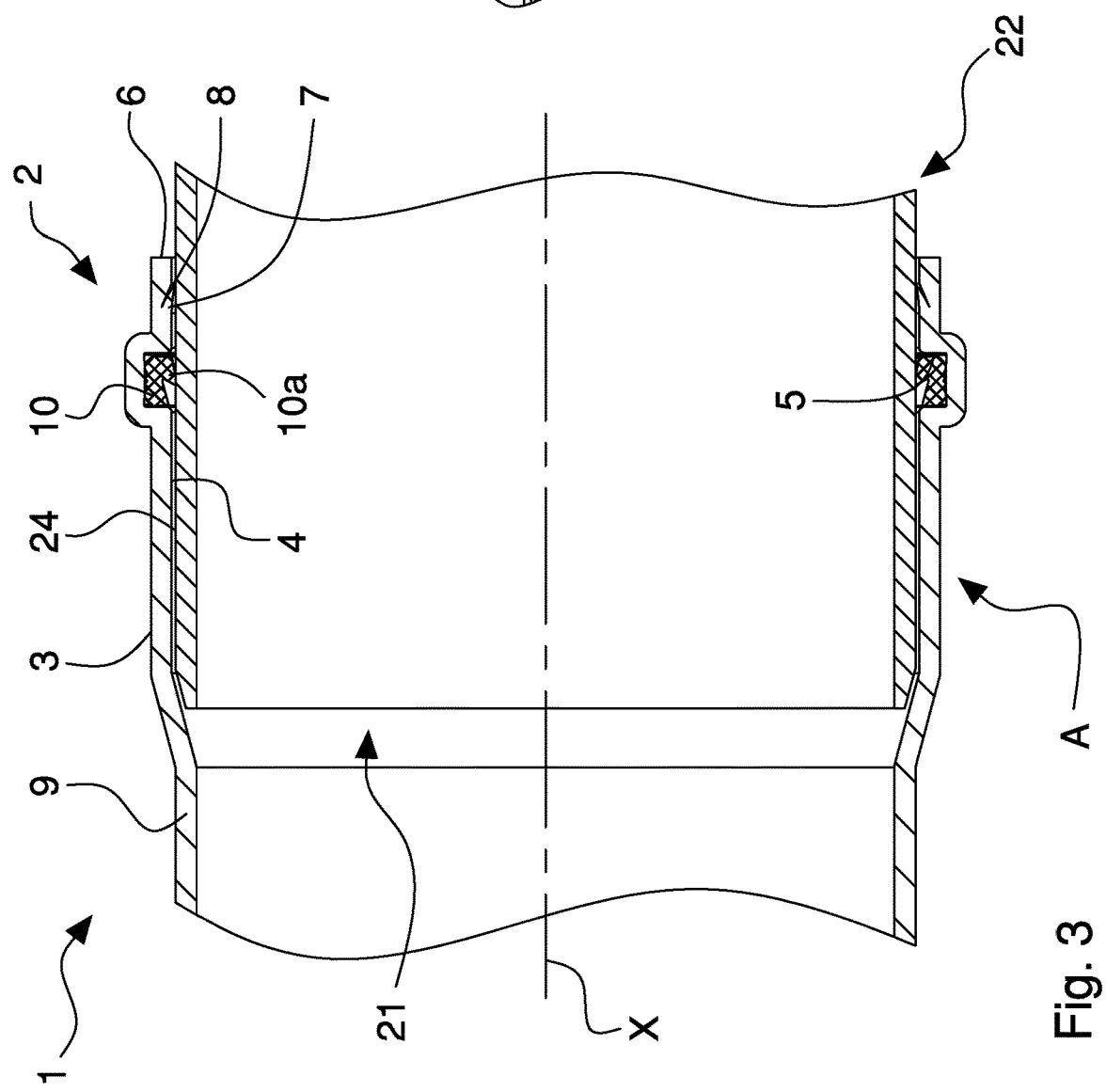

PLASTIC PIPE WITH BELL JOINT

The invention concerns pipes for creating fluid pipelines and in particular refers to a pipe made of plastics provided at one end with a bell joint to enable the joining to another pipe in order to form fluid ducts or pipelines.

In the field of plastics pipes, the type of joint that involves the junction of two subsequent pipes by means of sockets, or so-called "bell" joints, is widespread. Bell joint refers to the so-called "female" portion of the pipe end, that has an enlargement of the cross-section (external and internal diameters) such as to make a sort of enlarged tubular sleeve adapted to receive and couple with the so-called "male" end, which is normal and not enlarged, of the next pipe. An annular groove is generally made inside the joint, designed to form a seat capable of housing a gasket that ensures the hydraulic sealing of the pipeline, once the two pipes have been connected. The gasket may be a shaped gasket provided with a lip or a ring gasket with a so-called "O-ring" circular section.

Bell joints are typically made directly on the pipe end by means of hot plastic deformation of the aforesaid end (belling process) using appropriate moulding systems.

Plastic pipes with bell joints are largely used to create underground water pipes, especially for collecting and conveying rain water and/or waste water.

One of the problems to which these pipes are subject lies in the fact that invasive plant roots in the soil in which the pipes are laid can penetrate inside said pipes through the bell joints. More specifically, the roots—attracted by the humidity present in the soil surrounding the pipes and by the water flowing inside them—gradually and progressively enter inside the interstice formed by the external wall of the male end and the inner wall of the bell joint to reach and absorb the water. The gasket, made of an elastic, flexible and compressible material, is indeed not capable of blocking the progress of these invasive roots over time, especially over a long period of time, which gradually damage said gasket—irreparably in most cases—thus impairing the pipe hydraulic sealing. Once they enter through the gasket, the roots can progressively penetrate and expand inside the pipes until they partially, or even completely, obstruct the pipes.

It is therefore necessary to carry out costly and laborious maintenance procedures that require unearthing the obstructed section of the pipeline, disconnecting and cleaning the pipes obstructed by the roots and replacing the damaged gasket or even completely replacing the pipes, if the damage is irreparable.

An object of the present invention is improving the known pipes made of plastics, in particular pipes with bell joints, to form ducts or pipelines for rain water or waste water.

Another object is providing a pipe with a bell joint that can be rapidly and easily joined to other identical pipes so as to create a strong and robust pipe that is capable of preventing invasive plant roots from reaching and damaging the gasket, penetrating and entering said pipe, thus preventing it from becoming obstructed.

A further object is providing a pipe with a bell joint that is easy, rapid and economic to produce.

These and other objects are achieved by a pipe made of plastics according to one or more of the claims listed below.

The invention shall be better understood and implemented with reference to the enclosed drawings illustrating an exemplary and non-limiting embodiment, wherein:

FIG. 1 is a partial cross-section of a pipe of the invention provided with a bell joint at one end;

FIG. 2 is an enlarged detail of FIG. 1, illustrating an inner wall of the bell joint provided with a seat accommodating a gasket and with a closing lip;

FIG. 3 is a partial cross-section of the pipe of FIG. 1 connected to a further pipe in an assembled configuration so as to form a joint;

FIG. 4 is an enlarged detail of FIG. 3, illustrating the gasket and the closing lip abutting an external wall of the further pipe.

With reference to FIGS. 1 to 4, the pipe 1 is shown according to the invention, made of plastics, especially polyolefin or PVC, and comprising a female end 2 provided with a bell joint 3 suitable to receive a male end 22 of a further pipe 21. The bell joint 3 comprises an inner wall 4 provided with a seat 5 that houses a gasket 10 suitable to abut an external wall 24 of the male end 22 when the latter is inserted into the bell joint 3 in an assembled configuration A, wherein the pipe 1 and the further pipe 21 are mutually connected to form a joint 100. In the illustrated embodiment, the pipe 1 and the further pipe 21 extend along respective longitudinal axes X and have, for example, cylindrical walls of an essentially constant thickness. Similarly, the inner wall 4 of the bell joint 3 and the external wall 24 of the male end 22 have a cylindrical shape. Alternatively, it is considered that the inner wall 4 and the external wall 24 may have a conical frustum shape. In this case, the male end 23 of the further pipe 22 has a tapered shape and the external wall 24 converges towards a front edge, whilst the inner wall 4 of the bell joint 3 converges towards the inside, namely, towards a body 9 of the pipe 1.

The gasket 10 is, for example, a gasket with a closing lip 10a or, alternatively, can be toroidal, in the form of a so-called O-ring. In particular, said gasket 10 is capable of achieving the hydraulic sealing between the pipe 1 and the further pipe 21 and therefore preventing the leakage of fluid that flows inside said pipes.

On the inner wall 4 of the bell joint 3, at least one closing lip is further made 7 with an annular shape, extending towards the inside of the bell joint 3 and towards an external front edge 6 of said bell joint 3. The closing lip 7 includes an abutment edge 7a provided to adhere to, and tighten with a defined force, the external wall 24 of the male end 22 in the aforementioned assembled configuration A. To this end, the abutment edge 7a has an internal diameter less than the external diameter of the aforesaid external wall 24 in order to tighten the latter peripherally with a defined force, in particular proportional to a difference between said internal diameter and said external diameter. The closing lip 7 is also interposed between the seat 5 and the external front edge 6 and forms with the inner wall 4 an annular cavity 8 that opens in the direction of said external front edge 6. In this way, the closing lip 7 prevents plant roots from reaching and damaging the gasket 10 and thus impairing the hydraulic sealing of the joint 100.

The closing lip 7 is in a single body with the pipe 1 and is made directly on the inner wall 4 by machining with stock removal, for instance by using an engraving knife. Alternatively, the closing lip 7 is made by a thermoforming process of the inner wall 4, i.e. during the hot forming of the bell joint 3 on the female end 2 of the pipe 1. In this way, the closing lip 7 made directly on the inner wall 4 with the same material as the pipe 1 is almost rigid and partially deformable to enable the insertion of the male end 22 into the bell joint 3.

The closing lip 7 is also tooth or hook shaped in a section according to a plane passing through the longitudinal axis X of the pipe 1.

In an variant of the pipe 1, not illustrated, on the inner wall 4 of the bell joint 3 a plurality of closing lips 7 are provided, that are mutually spaced apart. The closing lips 7 are interposed between the seat 5 and the external front edge 6.

When in use, the pipe 1 and the further pipe 21 are mutually connected, by aligning them so that the respective longitudinal axes X coincide and, therefore, by inserting the male end 22 of the further pipe 21 into the bell joint 3 of the female end 2 of the pipe 1.

Whilst inserting the male end 22, the external wall 24 of the latter abuts the closing lip 7 which, whilst being rigid, since it is made directly on the inner wall 4 of the bell joint 3, partially and progressively deforms in order to permit the joining of the pipe 1 and the further pipe 21. Due to the deformation to which the closing lip 7 is subjected, it exerts a circumferential compression force radially directed towards the coinciding longitudinal axes X, the abutment edge 7a adhering tightly to and surrounding the external wall 24, in particular along the entire external diameter of the latter. The inner wall 4 and the external wall 24 form an interstice 15 between the external front edge 6 and the abutment edge 7a. In this way, the closing lip 7, being interposed between the gasket 10 and the external front edge 6, prevents the invasive roots of plants in the soil in which the pipe may be buried, from penetrating and entering inside the bell joint 3 through the interstice 15 and, thus, reaching the gasket 10, damaging it and impairing the hydraulic sealing of the joint 100. Advantageously, the closing lip 7 is located adjacent to the external front edge 6 of the bell joint 3 so as to minimise the length or depth of the interstice 15.

It should be noted that the annular cavity 8, formed by the closing lip 7 and the inner wall 4 of the bell joint 3, which opens towards the external front edge 6, contributes to prevent plant roots from entering the bell joint 3. In fact, plant roots that enter the interstice 15 by virtue of the tight adhesion of the abutment edge 7a on and surrounding the external wall 24 can only proceed gradually into the annular cavity 8, thus pushing the closing lip 7 further against the external wall 24, that is increasing the force with which the abutment edge 7a tightens around the external wall 24.

Thanks to the pipe 1 with a bell joint of the invention, it is therefore possible to produce strong and robust pipelines capable of preventing invasive plant roots for a long period of time from penetrating and entering said pipe, thus avoiding damage to the gasket 10 and impairment of the hydraulic sealing of the joint 100 and preventing the subsequent obstruction of said pipe by the roots.

The closing lip 7 (which is essentially rigid, adheres to and tightens with a defined force against the external wall 24 of the male end 22, extends towards the inside of the bell joint 3 and towards the external front edge 6 of the latter and has the annular cavity 8 that opens towards the external front edge 6) effectively blocks the penetration and spread of invasive roots, as it forms a physical and mechanical barrier that prevents the entry of such roots into the bell joint 3, also over a long period of time.

In particular, when the male end 22 of the further pipe 21 is inserted into the bell joint 3, the closing lip 7 is deformed so as to adhere to and firmly and robustly abut the external wall 24 of the further pipe 21. The compression force that the lip 7 may exert on the external wall 24 can be set by appropriately selecting the shape and size of said closing lip 7. More specifically, the size of the internal diameter of the closing lip 7 is less than the external diameter of the aforementioned external wall 24 so as to interfere with the latter, namely to tighten it with a defined force. For example, the internal diameter of the closing lip 7 is 1-1.5% less than the external diameter of the external wall 24.

In this way, as already pointed out, the force exerted by the closing lip 7 on the external wall 24 increases when the plant roots, having entered the interstice 15, penetrate inside the annular cavity 8.

It should be noted that since the closing lip 7 is in a single body with the pipe 1, made by machining with stock removal or directly by a thermoforming process of the inner wall 4, the pipe 1 of the invention is simple, rapid and economic to produce.

The invention claimed is:

1. A pipe made of plastic, the pipe comprising:
   a female end provided with a bell joint suitable to receive a male end of another pipe;
   an inner wall provided with a seat for a gasket; and
   a gasket provided in said seat, said gasket configured to abut an external wall of the male end of the another pipe in an assembled configuration,
   wherein when the pipe and the another pipe are connected to form a joint, said gasket achieves a hydraulic seal between the pipe and the another pipe,
   wherein said inner wall has at least one closing lip with an annular shape,
   wherein said at least one closing lip extends towards an inside of said bell joint and towards an external front edge of said bell joint, said at least one closing lip including an abutment edge configured to adhere to, and tighten to with a defined force, the external wall of the male end of the another pipe in the assembled configuration, and
   wherein said at least one closing lip is interposed between said seat and said external front edge and forms, with said inner wall, an annular cavity that opens in a direction of said external front edge and
   wherein the annular cavity extends radially inwardly into said inner wall of the pipe such that when the male end of the another pipe is connected to form a joint, the force exerted by said closing lip on the external wall of the another pipe increases when plant roots penetrate inside the annular cavity so as to prevent the plant roots from damaging said gasket.

2. The pipe according to claim 1, wherein said at least one closing lip is made on said inner wall by machining with stock removal.

3. The pipe according to claim 1, wherein said at least one closing lip is made by a thermoforming process of said inner wall.

4. The pipe according to claim 1, wherein said at least one closing lip is almost rigid and partially deformable to enable insertion of the male end of the another pipe into said bell joint.

5. The pipe according to claim 1, wherein said at least one closing lip has a tooth or hook shape in a sectional view along a plane passing through a longitudinal axis of the pipe.

6. The pipe according to claim 1, wherein said abutment edge of said at least one closing lip has an internal diameter that is less than an external diameter of the external wall of the male end of the another pipe in order to tighten to the external wall with the defined force, which is proportional to a difference between the internal diameter and the external diameter.

7. The pipe according to claim 1, wherein said at least one closing lip is adjacent to said external front edge.

8. The pipe according to claim 1, wherein said inner wall has a plurality of said at least one closing lip that are spaced apart from each other.

9. The pipe according to claim 8, wherein said plurality of closing lips are interposed between said seat and said external front edge.

\* \* \* \* \*